(12) United States Patent
Muhammad et al.

(10) Patent No.: US 12,309,693 B2
(45) Date of Patent: May 20, 2025

(54) CONTROL OF OPERATING STATE OF TERRESTRIAL BASE STATION VIA NON-TERRESTRIAL BASE STATION

(71) Applicant: RAKUTEN MOBILE, INC., Tokyo (JP)

(72) Inventors: Awn Muhammad, Tokyo (JP); Pankaj Shete, Tokyo (JP); Kenichiro Aoyagi, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/918,325

(22) PCT Filed: Jan. 28, 2022

(86) PCT No.: PCT/JP2022/003412
§ 371 (c)(1),
(2) Date: Oct. 12, 2022

(87) PCT Pub. No.: WO2023/145020
PCT Pub. Date: Aug. 3, 2023

(65) Prior Publication Data
US 2024/0214922 A1    Jun. 27, 2024

(51) Int. Cl.
*H04W 52/02* (2009.01)
*H04W 16/26* (2009.01)
*H04W 84/06* (2009.01)

(52) U.S. Cl.
CPC ....... *H04W 52/0206* (2013.01); *H04W 16/26* (2013.01); *H04W 84/06* (2013.01)

(58) Field of Classification Search
CPC .. H04W 52/0206; H04W 16/26; H04W 84/06
(Continued)

(56) References Cited

U.S. PATENT DOCUMENTS

| 6,408,180 B1 * | 6/2002 | McKenna | H01Q 1/28 |
| | | | 455/430 |
| 2002/0197990 A1 * | 12/2002 | Jochim | H04B 7/18506 |
| | | | 455/430 |

(Continued)

FOREIGN PATENT DOCUMENTS

| CN | 107466105 B | 1/2021 |
| JP | 2010278886 A | 12/2010 |

(Continued)

*Primary Examiner* — Nghi H Ly
(74) *Attorney, Agent, or Firm* — HAUPTMAN HAM, LLP

(57) ABSTRACT

A communication control apparatus has: a communication device detection unit that detects a communication device in a non-terrestrial communication cell provided on the ground by a flying non-terrestrial base station; a terrestrial communication cell detection unit that detects a terrestrial communication cell that can be provided on the ground by a terrestrial base station installed on the ground; and a terrestrial base station operating state control unit that controls the operating state of the terrestrial base station based on the detection results of the communication device detection unit and the terrestrial communication cell detection unit. The terrestrial communication cell detection unit and the terrestrial base station operating state control unit are installed in a ground station that is installed on the ground and can communicate with the non-terrestrial base station.

15 Claims, 2 Drawing Sheets

(58) Field of Classification Search
USPC .................... 455/419, 418, 422.1, 427, 561
See application file for complete search history.

(56) References Cited

U.S. PATENT DOCUMENTS

| | | |
|---|---|---|
| 2013/0244736 A1 | 9/2013 | Ho et al. |
| 2021/0099933 A1* | 4/2021 | Matsuda ......... H04W 36/00725 |
| 2021/0194571 A1 | 6/2021 | Ma et al. |
| 2023/0345341 A1* | 10/2023 | Speidel ................ H04W 24/04 |

FOREIGN PATENT DOCUMENTS

| | | |
|---|---|---|
| JP | 201229021 A | 2/2012 |
| JP | 2013542646 A | 11/2013 |
| JP | 202047976 A | 3/2020 |
| WO | 2021019711 A1 | 2/2021 |

* cited by examiner

CONTROL OF OPERATING STATE OF TERRESTRIAL BASE STATION VIA NON-TERRESTRIAL BASE STATION

RELATED APPLICATIONS

The present application is a National Phase of International Application Number PCT/JP2022/003412, filed Jan. 28, 2022.

BACKGROUND OF THE INVENTION

1. Field of the Invention

The present disclosure relates to control of operating state of terrestrial base station via non-terrestrial base station in communication system.

2. Description of the Related Art

The number, types, and applications of wireless communication devices, represented by smartphones and Internet of Things (IOT) devices, continue to increase, and wireless communication standards continue to be expanded and improved. For example, the commercial service of the fifth generation mobile communication system known as "5G" started in 2018, and the standards are still being developed by the 3GPP (Third Generation Partnership Project). Efforts are also underway to develop standards for "6G" or the sixth generation mobile communication system, which would be the next generation of wireless communication standards following 5G.

Mobile communication networks for mobile or portable communication devices such as smartphones and cell phones (hereinafter collectively referred to as "communication device (s)") are usually constructed by communication cells (hereinafter referred to as "terrestrial communication cell (s)") provided on the ground by base stations installed on the ground (hereinafter referred to as "terrestrial base station (s)"). However, in some areas, it was difficult to install a sufficient number of terrestrial base stations for various reasons, resulting in a relatively low quality of mobile communications.

In order to solve the issue of the disparity in mobile communication quality among different regions and the so-called "out-of-range" issue, where mobile communication devices cannot communicate in some regions, non-terrestrial networks (NTN) have been considered. In NTN, communication satellites or unmanned aircrafts flying in outer space or the atmosphere, such as the stratosphere, are used as base stations (hereinafter referred to as non-terrestrial base station (s), and especially communication satellites are referred to as satellite base station (s)). The non-terrestrial base station provides a communication cell on the ground (hereinafter referred to as non-terrestrial communication cell (s), and especially communication cells provided by communication satellites are referred to as satellite communication cell (s)). A communication device in a non-terrestrial communication cell communicates with a non-terrestrial base station directly or indirectly via other communication devices. By providing non-terrestrial communication cells in areas where terrestrial communication cells are not sufficient, the quality of mobile communication in such areas can be improved.

Patent Literature 1: JP-A-2010-278886

SUMMARY OF THE INVENTION

For example, although a non-terrestrial communication cell by a non-terrestrial base station is provided in a sparsely populated area, if a terrestrial communication cell by a terrestrial base station is also provided in such an area, it is assumed that there may be no communication devices connected to the terrestrial base station in the terrestrial communication cell. In such a case, power at the operating terrestrial base station is wasted.

The present disclosure was made in consideration of the situation, and the purpose is to provide a communication control apparatus and the like that can reduce power wasted at a terrestrial base station.

In order to solve the above issue, a communication control apparatus in a certain aspect of the present disclosure includes: a communication device detection unit that detects a communication device in a non-terrestrial communication cell provided on the ground by a flying non-terrestrial base station; a terrestrial communication cell detection unit that detects a terrestrial communication cell that can be provided on the ground by a terrestrial base station installed on the ground; and a terrestrial base station operating state control unit that controls the operating state of the terrestrial base station based on the detection results of the communication device detection unit and the terrestrial communication cell detection unit.

According to the aspect, the operating state of the terrestrial base station is controlled based on the detection results of the communication device in the non-terrestrial communication cell and the terrestrial communication cell that can be provided on the ground by the terrestrial base station. For example, when a communication device in a non-terrestrial communication cell is able to communicate with a non-terrestrial base station without any particular difficulty, the operating state of the terrestrial base station that can provide a terrestrial communication cell inside or around the non-terrestrial communication cell is set to a communication-disabled state.

Another aspect of the present disclosure is a communication control method. The communication control method includes: detecting a communication device in a non-terrestrial communication cell provided on the ground by a flying non-terrestrial base station; detecting a terrestrial communication cell that can be provided on the ground by a terrestrial base station installed on the ground; and controlling the operating state of the terrestrial base station based on the detection results of the communication device and the terrestrial communication cell.

Further another aspect of the present disclosure is a computer-readable medium. The computer-readable medium stores a communication control program causing a computer to perform: detecting a communication device in a non-terrestrial communication cell provided on the ground by a flying non-terrestrial base station; detecting a terrestrial communication cell that can be provided on the ground by a terrestrial base station installed on the ground; and controlling the operating state of the terrestrial base station based on the detection results of the communication device and the terrestrial communication cell.

In addition, any combination of the above components, and any conversion of the expression of the present disclosure among methods, devices, systems, recording media, computer programs, and the like, is also valid as a form of the present disclosure.

According to the present disclosure, power wasted at terrestrial base station can be reduced.

DETAILED DESCRIPTION OF THE INVENTION

The communication control apparatus according to the present disclosure can be applied to a network where a terrestrial network (TN) constructed by terrestrial communication cells provided on the ground by terrestrial base stations installed on the ground, and, a non-terrestrial network (NTN) constructed by non-terrestrial communication cells provide on the ground by flying non-terrestrial base stations coexist.

Figure 1:
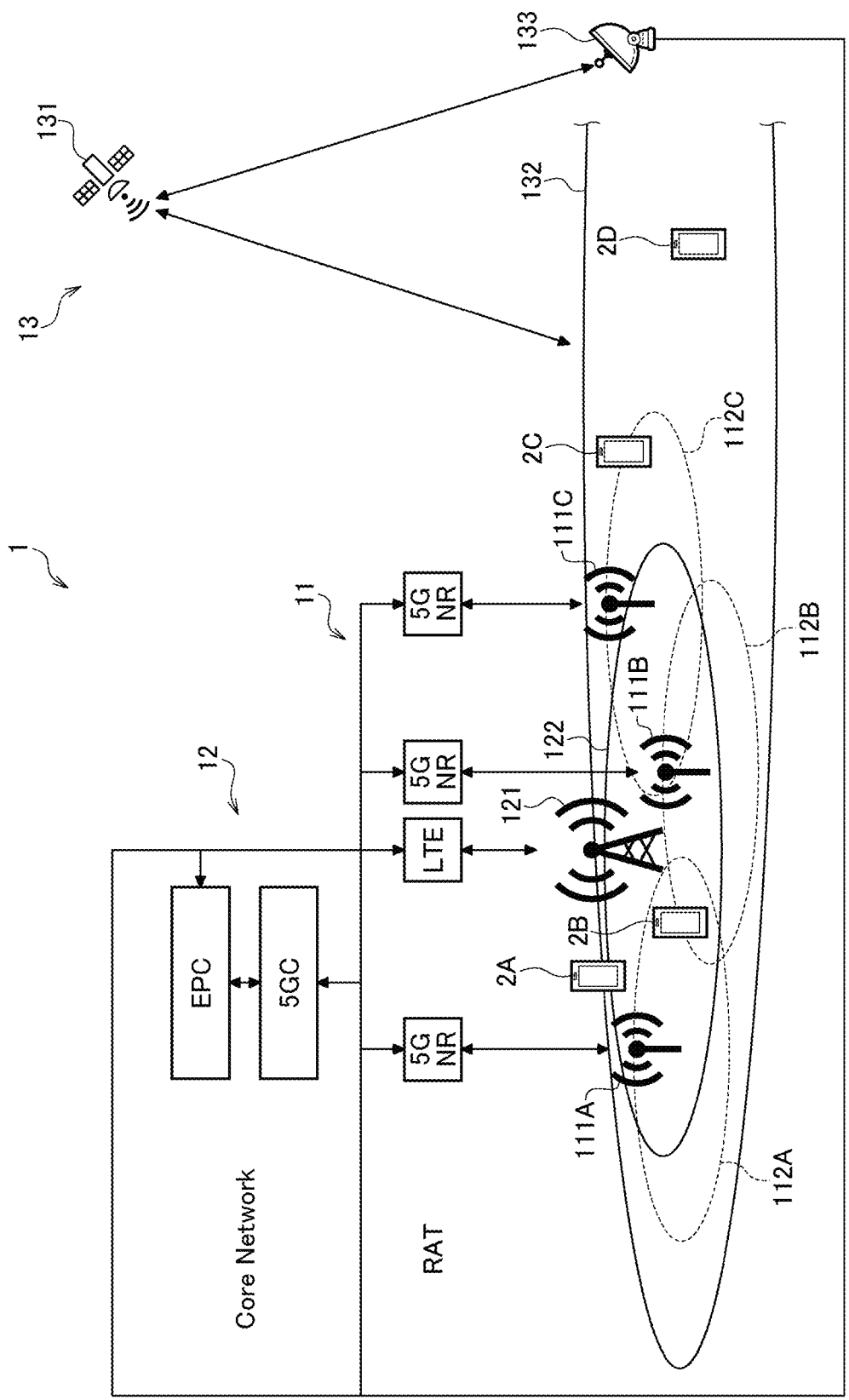
FIG. 1 schematically shows the overview of a wireless communication system to which the communication control apparatus is applied.

FIG. 1 schematically shows an overview of a wireless communication system 1 to which the communication control apparatus according to the present embodiment of the present disclosure is applied. The wireless communication system 1 includes 5G wireless communication system 11, 4G wireless communication system 12, and satellite communication system 13. 5G wireless communication system 11 that complies with the fifth generation mobile communication system (5G) uses NR (New Radio) or 5G NR (Fifth Generation New Radio) as the radio access technology (RAT) and 5GC (Fifth Generation Core) as the core network. 4G wireless communication system 12 that complies with the fourth generation mobile communication system (4G) uses LTE (Long Term Evolution) or LTE-Advanced as the radio access technology and EPC (Evolved Packet Core) as the core network. Satellite communication system 13 is for satellite communication via communication satellite 131. Although not shown in the figure, the wireless communication system 1 may include wireless communication networks of a generation prior to 4G, a generation later than 5G (e.g. 6G), or any wireless communication networks that are not associated with generations, such as Wi-Fi (registered trademark).

The 5G wireless communication system 11 may include a plurality of 5G base stations 111A, 111B, and 111C (hereinafter collectively referred to as 5G base station 111) installed on the ground capable of communicating by 5G NR with communication devices 2A, 2B, 2C, and 2D (hereinafter collectively referred to as communication device (s) 2) such as smartphones, which are also referred to as UE (User Equipment). 5G base station 111 is also referred to as gNodeB (gNB). The coverage or support range of each 5G base station 111A, 111B and 111C is referred to as a cell 112A, 112B and 112C (hereinafter collectively referred to as 5G cell 112).

The size of the 5G cell 112 of each 5G base station 111 is arbitrary, but typically ranges from a few meters to several tens of kilometers in radius. Although there is no established definition, cells with a radius of a few meters to ten meters are called femtocells, cells with a radius of ten meters to several tens of meters are called picocells, cells with a radius of several tens of meters to several hundred meters are called microcells, and cells with a radius of more than several hundreds of meters are called macrocells. In 5G, high frequency radio waves such as millimeter waves are often used, and their high tendency to propagate in a straight-line causes radio waves to be blocked by obstacles, shortening the communication distance. For the reason, 5G tends to use more small cells than 4G and earlier generations.

The communication device 2 can conduct 5G communication when it is located within at least one of a plurality of 5G cells 112A, 112B and 112C. In the example shown in the figure, communication device 2B in 5G cells 112A and 112B can communicate with both 5G base stations 111A and 111B by 5G NR. In addition, the communication device 2C in the 5G cell 112C can communicate with the 5G base station 111C by 5G NR. Communication device 2A and 2D are outside of all 5G cells 112A, 112B and 112C, so they are not able to communicate by 5G NR. The 5G NR-based 5G communication between each communication device 2 and each 5G base station 111 is managed by the 5GC, which is the core network. For example, the 5GC transfers data to and from each 5G base station 111, transfers data to and from external networks such as the EPC, the satellite communication system 13 and the Internet, and manages the movement of the communication device 2.

The 4G wireless communication system 12 includes a plurality of 4G base stations 121 (only one of them is shown in FIG. 1) installed on the ground that can communicate with the communication device 2 by LTE or LTE-Advanced. The base station 121 in 4G is referred to as eNodeB (eNB). Similarly to each 5G base station 111, the communication range or support range of each 4G base station 121 is also called a cell and is shown as 122.

The communication device 2 can conduct 4G communication when it is located within 4G cell 122. In the example shown in the figure, the communication devices 2A and 2B in the 4G cell 122 can communicate with the 4G base station 121 by LTE or LTE-Advanced. Communication device 2C and 2D are outside the 4G cell 122 and are not able to communicate by LTE or LTE-Advanced. The 4G communication by LTE and LTE-Advanced between each communication device 2 and each 4G base station 121 is managed by the EPC, which is the core network. For example, the EPC manages the transfer of data to and from each 4G base station 121, the transfer of data to and from external networks such as 5GC, the satellite communication system 13 and the Internet, and the movement management of the communication device 2.

If we take a look at each communication device 2A, 2B, 2C and 2D in the example shown in the figure, the communication device 2A is in a state that enables 4G communication with 4G base station 121, and communication device 2B is in a state that enables 5G communication with 5G base stations 111A and 111B and 4G communication with 4G base station 121, and communication device 2C is in a state that enables 5G communication with 5G base station 111C. When there are multiple base stations (111A, 111B and 121) as in the case of communication device 2B, one base station is selected as the most suitable for the communication device 2B in terms of communication quality and the like, under the control of the 5GC and/or the EPC, which is the core network. For the communication device 2D that is not in a state that enables 5G communication with any 5G base station 111 or 4G communication with any 4G base station 121, the communication is conducted using the satellite communication system 13 described below.

The satellite communication system 13 is the wireless communication system using communication satellites 131 as non-terrestrial base stations. The communication satellites 131 are low-earth-orbit satellites flying in low-earth-orbit outer space of 500 to 700 km above the ground. Similarly to 5G base station 111 and 4G base station 121, the communication range or support range of each communication satellite 131 is also called a cell and is shown as 132. Thus, a communication satellite 131 as a non-terrestrial base station provides a satellite communication cell 132 as a non-terrestrial communication cell onto the ground. Communication device 2 on the ground can conduct satellite communication when it is inside the satellite communication cell 132. Similarly to 5G base station 111 in the 5G wireless communication system 11 and 4G base station 121 in the 4G wireless communication system 12, communication satellite 131 as the base station in the satellite communication system 13 is capable of wireless communication directly or indirectly via aircraft and the like with the communication device 2 within the satellite communication cell 132. The radio access technology used by the communication satellite 131 for wireless communication with the communication device 2 in the satellite communication cell 132 may be 5G NR, the same as the 5G base station 111, or LTE or LTE-Advanced, the same as the 4G base station 121, or any other radio access technology that the communication device 2 can use. Therefore, there is no need for the communication device 2 to have any special functions or components for satellite communication.

The satellite communication system 13 is equipped with a gateway 133 as a ground station that is installed on the ground and can communicate with the communication satellite 131. The gateway 133 is equipped with a satellite antenna to communicate with the communication satellite 131, and is connected to the 5G base station 111 and/or the 4G base station 121 as terrestrial base stations that constitute the terrestrial network (TN), via the 5G NR and/or LTE as the respective radio access technologies or other wired or wireless access technologies and/or interfaces. In such a manner, the gateway 133 connects the non-terrestrial network (NTN), which includes communication satellites 131, and the terrestrial network TN, which includes terrestrial base stations 111 and 121, for mutual communication. When the communication satellite 131 conducts 5G communication with the communication device 2 in the satellite communication cell 132 by 5G NR, the 5GC connected via the gateway 133 and the 5G base station 111 in the TN (or the 5G radio access network) is used as the core network. When the communication satellite 131 conducts 4G communication with the communication device 2 in the satellite communication cell 132 by LTE or LTE-Advanced, the EPC connected via the gateway 133 and the 4G base station 121 in the TN (or the 4G radio access network) is used as the core network. In such a manner, appropriate coordination is made between different wireless communication systems such as 5G wireless communication system 11, 4G wireless communication system 12, satellite communication system 13 and the like through the gateway 133.

Satellite communication by communication satellites 131 is mainly used for covering areas with no or few terrestrial base stations such as 5G base stations 111 and 4G base stations 121 and the like. In the example shown in the figure, a communication device 2D that is outside the communication cells of all the terrestrial base stations communicates with the communication satellite 131. On the other hand, communication devices 2A, 2B and 2C that are in good communication with either of the terrestrial base stations, are also in the satellite communication cell 132 and can communicate with the communication satellite 131. However, by communicating with the terrestrial base stations instead of the communication satellite 131 as the satellite base station in principle, the limited communication resources (including power) of the communication satellite 131 are saved for the communication device 2D and the like. The communication satellite 131 uses beamforming to direct the communication radio wave to the communication device 2D in the satellite communication cell 132, thereby the communication quality with the communication device 2D is improved.

The size of the satellite communication cell 132 of the communication satellite 131 as a satellite base station depends on the number of beams emitted by the communication satellite 131. For example, a satellite communication cell 132 with a diameter of approximately 24 km can be formed by combining up to 2,800 beams. As illustrated, a satellite communication cell 132 is typically larger than a terrestrial communication cell such as a 5G cell 112 or a 4G cell 122, and could contain one or more 5G cells 112 and/or 4G cells 122 inside it. The above example shows a communication satellite 131 flying in low-earth-orbit (LEO: Low Earth Orbit) outer space at a height of approximately 500 km to 700 km above the ground as a flying non-terrestrial base station. However, a communication satellite flying in geostationary orbit (GEO: Geosynchronous Equatorial Orbit) or other higher orbit in outer space, or an unmanned or manned aircraft flying in stratosphere or other lower (e.g. approximately 20 km above the ground) atmosphere may be used as a non-terrestrial base station in addition to or instead of the communication satellite 131.

As described above, the wireless communication system 1 according to the present embodiment includes the terrestrial network (TN) 11, 12, capable of communicating with communication device 2 in the terrestrial communication cell 112, 122 provided on the ground by terrestrial base station 111, 121 installed on the ground, and the non-terrestrial network (NTN) 13, capable of communicating with communication device 2 in the non-terrestrial communication cell 132 provided on the ground by flying non-terrestrial base station 131. The communication control apparatus according to the present embodiment controls the TN and the NTN.

Figure 2:
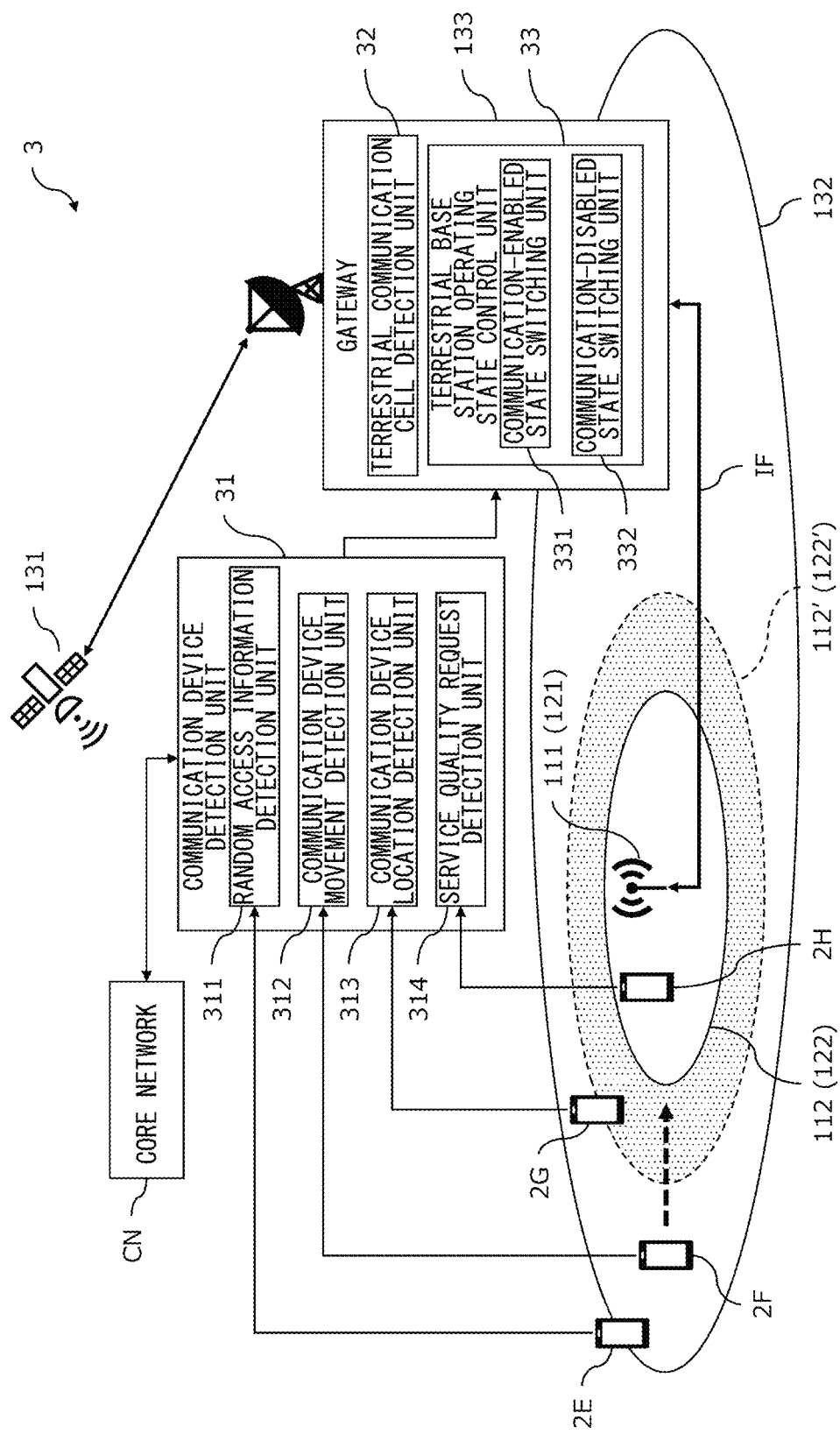
FIG. 2 is a functional block diagram of the communication control apparatus.

FIG. 2 is a functional block diagram of the communication control apparatus 3 according to the present embodiment. The communication control apparatus 3 has a communication device detection unit 31, a terrestrial communication cell detection unit 32, and a terrestrial base station operating state control unit 33. The functional blocks are realized by the cooperation of hardware resources, such as the central processing unit, memory, input devices, output devices, and peripheral devices connected to the computer, and software that is executed using them. Regardless of the type of computer or the installation location, each of the above functional blocks may be realized with the hardware resources of a single computer, or by combining hardware resources distributed across multiple computers. For example, some or all of functional blocks of the communication control apparatus 3 may be realized in a distributed or centralized manner by computer and/or processor provided in the communication device 2, the terrestrial base stations 111, 121, the non-terrestrial base station 131, the gateway 133, and the core network CN. As discussed below, in the example in FIG. 2, the terrestrial communication cell detection unit 32 and the terrestrial base station operating state control unit 33 are provided in the gateway 133, but in other examples, some or all of the functional blocks may be realized in computer and/or processor provided outside of the gateway 133.

The communication device detection unit 31 detects a communication device 2 in a satellite communication cell 132 provided on the ground by a communication satellite 131. FIG. 2 shows illustratively and schematically four communication devices 2E-2H (collectively referred to as communication devices 2 as before) according to the four types of information detected by the communication device detection unit 31. In the following, the four types of information related to the four communication devices 2E-2H will be explained individually, but in the actual operation of the wireless communication system 1, the types of information can be combined arbitrarily to control communication. In order to detect each of the four types of information related to communication device 2, the communication device detection unit 31 includes a random access information detection unit 311, a communication device movement detection unit 312, a communication device location detection unit 313, and a service quality request detection unit 314. The four detection units 311-314 are shown as separate functional units for convenience of explanation only, and they may actually be configured as one unified functional unit, hardware, software, artificial intelligence and the like.

The random access information detection unit 311 detects the communication device 2E based on random access information transmitted by the communication device 2E in the satellite communication cell 132 to the communication satellite 131. The communication device 2E that has been turned on in the satellite communication cell 132 and/or the communication device 2E that has just been "out of range" and entered the satellite communication cell 132, perform a predetermined random access procedure with the communication satellite 131 in order to initiate mobile communication with the NTN. The general random access procedure in 4G and/or 5G is initiated by the transmission of a random access preamble (also referred to briefly below as a preamble) as random access information from the communication device 2E to the communications satellite 131.

The communication device 2E selects any one preamble from the limited number (e.g. 64) of mutually orthogonal preambles that the communication satellite 131 can accept, and transmits the selected preamble to the communication satellite 131 using a predetermined time-frequency resource reserved as a PRACH (Physical Random Access Channel) in each uplink frame for preamble transmission. The random access information detection unit 311 detects that the communication device 2E is in the satellite communication cell 132, based on the preamble transmitted by the communication device 2E to the communication satellite 131. The random access information detection unit 311 may be provided in the communication satellite 131 that directly receives the preamble from the communication device 2E, or in the gateway 133 and/or the core network CN that can communicate with the communication satellite 131.

The communication device movement detection unit 312 detects the movement of the communication device 2F in the satellite communication cell 132. Specifically, as described below with respect to the terrestrial base station operating state control unit 33, the terrestrial base stations 111, 121 that provide the terrestrial communication cells 112, 122 are controlled to different operating states, depending on whether the communication device 2F is moving toward the terrestrial communication cells 112, 122 inside or outside the satellite communication cell 132. The movement of the communication device 2F is detected, for example, by a satellite positioning device such as a GPS module installed in the communication device 2F, and is reported from the communication device 2F to the communication satellite 131. In such a case, the communication device movement detection unit 312 may be provided in the communication satellite 131 that directly receives the satellite positioning information from the communication device 2F, or in the gateway 133 and/or the core network CN that can communicate with the communication satellite 131. The information concerning the movement of the communication device 2F may also be obtained through the LMF (Location Management Function) provided in the 5GC, the core network CN of 5G.

The communication device location detection unit 313 detects the location of the communication device 2G in the satellite communication cell 132. Specifically, as described below with respect to the terrestrial base station operating state control unit 33, the terrestrial base stations 111, 121 that provide the terrestrial communication cells 112, 122 are controlled to different operating states, depending on whether the location of the communication device 2G is within a predetermined distance 112', 122' from the terrestrial communication cells 112, 122 inside or outside the satellite communication cell 132. The location of the communication device 2G is detected, for example, by a satellite positioning device such as a GPS module installed in the communication device 2G, and is reported from the communication device 2G to the communication satellite 131. In such a case, the communication device location detection unit 313 may be provided in the communication satellite 131 that directly receives the satellite positioning information from the communication device 2G, or in the gateway 133 and/or the core network CN that can communicate with the communication satellite 131. The information concerning the location of the communication device 2G may also be obtained through the LMF provided in the 5GC.

The service quality request detection unit 314 detects the service quality request of the communication device 2H in the satellite communication cell 132. Specifically, as described below with respect to the terrestrial base station operating state control unit 33, the terrestrial base stations 111, 121 that provide the terrestrial communication cells 112, 122 are controlled to the operating state that enables communication with the communication device 2H, when the communication satellite 131 cannot meet the high Qos (Quality of Service) request in case the communication device 2H in communication with the communication satellite 131 in the overlapping area of the satellite communication cell 132 and the terrestrial communication cells 112, 122 conducts priority communication such as emergency communication such as emergency call, VOLTE in 4G, VoNR in 5G. The service quality request detection unit 314 may be provided in the communication satellite 131 that directly receives the service request such as priority communication from the communication device 2H, or in the gateway 133 and/or the core network CN that can communicate with the communication satellite 131. The information concerning the service quality request of the communication device 2H may also be obtained through the core network CN involved in providing various services to the communication device 2H, and/or servers of service providers that provide various services to the communication device 2H on a general network such as the internet and the like.

In addition to or instead of the above four types of information related to communication devices 2, the communication device detection unit 31 may also detect the location registration area and/or tracking area (TA) of the communication devices 2. The location registration area, which is registered to track or detect the approximate location of the communication devices 2, typically consists of a plurality of communication cells. The location registration area of each communication device 2 is registered in the Home Location Register (HLR) and the like in the core network CN in the form of a Tracking Area Code (TAC) and the like. For communication devices 2E-2H in the satellite communication cell 132 illustrated in FIG. 2, the TAC indicating the location registration area to which the satellite communication cell 132 belongs is registered in the HLR. If the location registration area includes other communication cells not shown in the figure, the TAC obtained by the communication device detection unit 31 is not enough to determine whether each communication device 2 is in the satellite communication cell 132 or in other communication cells not shown. However, it is at least possible to determine that each communication device 2 is in the vicinity of the satellite communication cell 132. The communication device detection unit 31 may detect that each communication device 2 is in the satellite communication cell 132 by detecting the connection state that each communication devices 2 is connected to the communication satellite 131.

The terrestrial communication cell detection unit 32 detects the terrestrial communication cells 112, 122 that can be provided on the ground by the terrestrial base stations 111, 121. Particularly in the embodiment, the terrestrial communication cells 112 and 122 entirely contained in the satellite communication cell 132 (the entire terrestrial communication cells 112 and 122 overlap with the satellite communication cell 132) as shown in FIG. 2; the terrestrial communication cells 112 and 122 partly contained in the satellite communication cell 132 (the portions of the terrestrial communication cells 112 and 122 overlap with the satellite communication cell 132); and/or the terrestrial communication cells 112 and 122 provided in the vicinity area adjacent or in close proximity to the satellite communication cell 132 (e.g. the terrestrial communication cells 112 and 122 outside the satellite communication cell 132 that belong to the same location registration area as the satellite communication cell 132) are detected. The terrestrial communication cells 112 and 122 are hereinafter collectively referred to as NTN-peripheral terrestrial communication cells 112 and 122. The terrestrial communication cell detection unit 32 is provided in the gateway 133 as a ground station, and acquires information such as coverage of each of the NTN-peripheral terrestrial communication cells 112 and 122 from the terrestrial base stations 111 and 121, through an inter-station interface IF between the gateway 133 and each of the terrestrial base stations 111 and 121. The X2 interface and the Xn interface in 4G and/or 5G are examples of the inter-station interface IF.

The terrestrial base station operating state control unit 33 controls the operating state of the terrestrial base stations 111, 121 based on the detection results of the communication device detection unit 31 and the terrestrial communication cell detection unit 32. The main functions of the terrestrial base station operating state control unit 33 are switching of the terrestrial base stations 111, 121 to the communication-enabled state by a communication-enabled state switching unit 331, and switching of the terrestrial base stations 111, 121 to the communication-disabled state by a communication-disabled state switching unit 332. The terrestrial base stations 111 and 121 that are in the communication-enabled state can communicate with communication devices 2 in the NTN-peripheral terrestrial communication cells 112 and 122 provided by the terrestrial base stations 111 and 121, and the terrestrial base stations 111 and 121 that are in the communication-disabled state do not provide the NTN-peripheral terrestrial communication cells 112 and 122 and cannot communicate with the communication devices 2.

In addition to or instead of the communication-enabled state and the communication-disabled state, the terrestrial base station operating state control unit 33 may control the terrestrial base stations 111, 121 into other operating states. For example, the terrestrial base station operating state control unit 33 may control the terrestrial base stations 111, 121 into operating states such as: the communication-enhanced state, in which the terrestrial base stations 111, 121 not only can communicate with communication devices 2 in the NTN-peripheral terrestrial communication cells 112, 122, but also will be allocated more communication resources than usual if the number of communication devices 2 is large and/or if the service quality requests of communication devices 2 are high; and the communication-restricted state, in which the communication resources allocated to the terrestrial base stations 111, 121 will be restricted or reduced than usual, instead of the communication with communication devices 2 being completely disabled.

The terrestrial base station operating state control unit 33 is provided in the gateway 133 as a ground station together with the terrestrial communication cell detection unit 32, and controls the operating state of each of the terrestrial base stations 111, 121 through the inter-station interface IF such as the X2 interface and the Xn interface between the gateway 133 and each of the terrestrial base stations 111, 121.

The specific and illustrative control examples by the terrestrial base station operating state control unit 33 are then described separately for each type of information detected by the communication device detection unit 31. It should be noted that the terrestrial base station operating state control unit 33 in the actual wireless communication system 1 can combine the control examples as desired.

In the first control example, the communication-enabled state switching unit 331 switches the operating state of the terrestrial base stations 111, 121 that can provide the NTN-peripheral terrestrial communication cells 112, 122 to the communication-enabled state, when the communication device detection unit 31 detects a communication device 2 (e.g. 2E-2H) in the satellite communication cell 132. And, the communication-disabled state switching unit 332 switches the operating state of the terrestrial base stations 111, 121 that can provide the NTN-peripheral terrestrial communication cells 112, 122 to the communication-disabled state, when the communication device detection unit 31 does not detect a communication device 2 in the satellite communication cell 132.

For example, when the preamble (random access information) transmitted by the communication device 2 in the satellite communication cell 132 to the communication satellite 131 is detected by the random access information detection unit 311 (or when the communication device 2 connected to the communication satellite 131 following the completion of the random access procedure is detected by the communication device detection unit 31), the terrestrial base stations 111, 121 switched to the communication-enabled state by the communication-enabled state switching unit 331 will start or restart to provide the NTN-peripheral terrestrial communication cells 112, 122. In such a case, the communication satellite 131 may intentionally not return a response (a random access response) to the preamble transmitted by the communication device 2H in the overlapping area of the satellite communication cell 132 and the NTN-peripheral terrestrial communication cells 112, 122 (the entire NTN-peripheral terrestrial communication cells 112, 122 in the example in FIG. 2), thereby the communication device 2H may be induced to start the random access procedure to the newly activated terrestrial base stations 111, 121.

Note that the communication-enabled state switching unit 331 may selectively set only the NTN-peripheral terrestrial communication cells 112, 122 which entirely or partly overlap with the satellite communication cell 132 to the communication-enabled state (other NTN-peripheral terrestrial communication cells 112, 122 outside the satellite communication cell 132 and the like remain the communication-disabled state for example), instead of setting all the NTN-peripheral terrestrial communication cells 112, 122 to the communication-enabled state. In such a case, the NTN-peripheral terrestrial communication cells 112, 122 can provide high quality communication services to the communication devices 2 in the satellite communication cell 132. Conversely, the communication-enabled state switching unit 331 may selectively set only the NTN-peripheral terrestrial communication cells 112, 122 which do not overlap with the satellite communication cell 132 (the NTN-peripheral terrestrial communication cells 112, 122 completely outside the satellite communication cell 132) to the communication-enabled state. In such a case, while the communication satellite 131 provides the communication service in the satellite communication cell 132, the NTN-peripheral terrestrial communication cells 112, 122 can be activated in advance in case the communication devices 2 go outside the satellite communication cell 132. Here, the terrestrial base station operating state control unit 33 can determine whether the satellite communication cell 132 and each NTN-peripheral terrestrial communication cell 112, 122 overlap or not, based on the coverage of each NTN-peripheral terrestrial communication cell 112, 122 acquired by the terrestrial communication cell detection unit 32.

On the other hand, when the preamble transmitted by the communication device 2 in the satellite communication cell 132 to the communication satellite 131 is not detected by the random access information detection unit 311 (or when the communication device 2 connected to the communication satellite 131 following the completion of the random access procedure is not detected by the communication device detection unit 31), the terrestrial base stations 111, 121 switched to the communication-disabled state by the communication-disabled state switching unit 332 will stop providing the NTN-peripheral terrestrial communication cells 112, 122. In such a manner, since it is assumed that there is no communication device 2 to be connected to the terrestrial base stations 111, 121 in the NTN-peripheral terrestrial communication cells 112, 122 in a situation where it is believed that there is no communication device 2 in the satellite communication cell 132, wasted power can be reduced by switching the terrestrial base stations 111, 121 to the communication-disabled state. Note that the communication-disabled state switching unit 332 may selectively set only the NTN-peripheral terrestrial communication cells 112, 122 which entirely or partly overlap with the satellite communication cell 132 to the communication-disabled state (other NTN-peripheral terrestrial communication cells 112, 122 outside the satellite communication cell 132 and the like remain the communication-enabled state for example), instead of setting all the NTN-peripheral terrestrial communication cells 112, 122 to the communication-disabled state.

Note that the communication-disabled state switching unit 332 may set the operating state of the terrestrial base stations 111, 121 to the communication-disabled state, when no communication device 2 is detected in the satellite communication cell 132 by the random access information detection unit 311 for a predetermined time period. Furthermore, the communication-disabled state switching unit 332 may selectively switch only the terrestrial base stations 111, 121 that can provide the NTN-peripheral terrestrial communication cells 112, 122 overlapping with the satellite communication cell 132 to the communication-disabled state. In such a case, the terrestrial base stations 111, 121 that provide the NTN-peripheral terrestrial communication cells 112, 122 not overlapping with the satellite communication cell 132 (the NTN-peripheral terrestrial communication cells 112, 122 completely outside the satellite communication cell 132) are not switched to communication-disabled state. When such terrestrial base stations 111, 121 are switched to the communication-disabled state, even if there were any communication devices 2 that had been connected to the terrestrial base stations 111, 121, they can reconnect to the communication satellite 131 to receive continuous services.

When a communication device 2 is detected by the communication device detection unit 31 in the location registration area to which the satellite communication cell 132 belongs (specifically when there is a communication device 2 for which the TAC of the location registration area is registered in the HLR), the terrestrial base stations 111, 121 switched to the communication-enabled state by the communication-enabled state switching unit 331 may start or restart to provide the NTN-peripheral terrestrial communication cells 112, 122. Similarly, when a communication device 2 is not detected by the communication device detection unit 31 in the location registration area to which the satellite communication cell 132 belongs (specifically when there is not a communication device 2 for which the TAC of the location registration area is registered in the HLR), the terrestrial base stations 111, 121 switched to the communication-disabled state by the communication-disabled state switching unit 332 will stop providing the NTN-peripheral terrestrial communication cells 112, 122.

In such a manner, since it is assumed that there is no communication device 2 to be connected to the terrestrial base stations 111, 121 in the NTN-peripheral terrestrial communication cells 112, 122 in a situation where it is believed that there is no communication device 2 in the location registration area to which the satellite communication cell 132 belongs, wasted power can be reduced by switching the terrestrial base stations 111, 121 to the communication-disabled state. Note that the communication-disabled state switching unit 332 may set the operating state of the terrestrial base stations 111, 121 to the communication-disabled state, when no communication device 2 is detected in the location registration area by the communication device detection unit 31 for a predetermined time period. Furthermore, the communication-disabled state switching unit 332 may selectively switch only the terrestrial base stations 111, 121 that can provide the NTN-peripheral terrestrial communication cells 112, 122 overlapping with the satellite communication cell 132 to the communication-disabled state.

In the second control example, the communication-enabled state switching unit 331 sets the operating state of the terrestrial base stations 111, 121 that can provide the NTN-peripheral terrestrial communication cells 112, 122 to the communication-enabled state, when the communication device 2 (2F and the like) moving toward the NTN-peripheral terrestrial communication cells 112, 122 is detected by the communication device movement detection unit 312. And, the communication-disabled state switching unit 332 sets the operating state of the terrestrial base stations 111, 121 that can provide the NTN-peripheral terrestrial communication cells 112, 122 to the communication-disabled state, when the communication device 2 moving toward the NTN-peripheral terrestrial communication cells 112, 122 is not detected by the communication device movement detection unit 312.

In such a manner, since no communication device 2 is expected to appear in the foreseeable future to be connected to the terrestrial base stations 111, 121 in the NTN-peripheral terrestrial communication cells 112, 122 in a situation where there is no communication device 2 (2H and the like) in the NTN-peripheral terrestrial communication cells 112, 122 and no communication device 2 (2F and the like) is moving toward the NTN-peripheral terrestrial communication cells 112, 122, wasted power can be reduced by switching the terrestrial base stations 111, 121 to the communication-disabled state. As in the other control examples described above, the communication-disabled state switching unit 332 may selectively switch only the terrestrial base stations 111, 121 that can provide the NTN-peripheral terrestrial communication cells 112, 122 overlapping with the satellite communication cell 132 to the communication-disabled state.

In the third control example, the communication-enabled state switching unit 331 sets the operating state of the terrestrial base stations 111, 121 that can provide the NTN-peripheral terrestrial communication cells 112, 122 to the communication-enabled state, when the communication device 2 (2G and the like) located within a predetermined distance 112', 122' from the NTN-peripheral terrestrial communication cells 112, 122 is detected by the communication device location detection unit 313. And, the communication-disabled state switching unit 332 sets the operating state of the terrestrial base stations 111, 121 that can provide the NTN-peripheral terrestrial communication cells 112, 122 to the communication-disabled state, when the communication device 2 located within a predetermined distance 112', 122' from the NTN-peripheral terrestrial communication cells 112, 122 is not detected by the communication device location detection unit 313.

In such a manner, since no communication device 2 is expected to appear in the foreseeable future to be connected to the terrestrial base stations 111, 121 in the NTN-peripheral terrestrial communication cells 112, 122 in a situation where there is no communication device 2 (2H and the like) in the NTN-peripheral terrestrial communication cells 112, 122 and no communication device 2 (2G and the like) is located within a predetermined distance 112', 122' from the NTN-peripheral terrestrial communication cells 112, 122, wasted power can be reduced by switching the terrestrial base stations 111, 121 to the communication-disabled state. As in the other control examples described above, the communication-disabled state switching unit 332 may set the operating state of the terrestrial base stations 111, 121 to the communication-disabled state, when no communication device 2 is detected in a predetermined distance 112', 122' from the NTN-peripheral terrestrial communication cells 112, 122 by the communication device location detection unit 313 for a predetermined time period. Furthermore, the communication-disabled state switching unit 332 may selectively switch only the terrestrial base stations 111, 121 that can provide the NTN-peripheral terrestrial communication cells 112, 122 overlapping with the satellite communication cell 132 to the communication-disabled state.

In the fourth control example, the communication-enabled state switching unit 331 sets the operating state of the terrestrial base stations 111, 121 that can provide the NTN-peripheral terrestrial communication cells 112, 122 to the communication device 2 to the communication-enabled state, when the communication satellite 131 cannot meet the service quality request of the communication device 2 (2H and the like) in the satellite communication cell 132 detected by the service quality request detection unit 314. For example, the terrestrial base stations 111, 121 that provides the NTN-peripheral terrestrial communication cells 112, 122 is controlled to the operating state that enables communication with the communication device 2H, when the communication device 2H connected to the communication satellite 131 in the overlapping area of the satellite communication cell 132 and the NTN-peripheral terrestrial communication cells 112, 122 conducts priority communication with high QoS request such as emergency communication such as emergency call, VOLTE in 4G, VONR in 5G, and the communication satellite 131 cannot meet the QoS request. Conversely, if the communication satellite 131 can meet the QoS request of the communication device 2H, the NTN-peripheral terrestrial communication cells 112, 122 in the overlapping area with the satellite communication cell 132 can remain the communication-disabled state, thereby wasted power can be reduced at the terrestrial base stations 111, 121.

The present disclosure has been described above based on embodiments. It is understood by those skilled in the art that the embodiments are exemplary and that various variations are possible in the combination of each component and each process thereof, and that such variations are also within the scope of the present disclosure.

The functional configuration of each device described in the embodiment can be realized by hardware resources or software resources, or by the cooperation of hardware resources and software resources. As hardware resources, processors, ROM, RAM, and other LSIs can be used. Operating systems, applications, and other programs can be used as software resources.

The present disclosure may be expressed as the following items.

1. A communication control apparatus comprising:
  a communication device detection unit that detects a communication device in a non-terrestrial communication cell provided on the ground by a flying non-terrestrial base station;
  a terrestrial communication cell detection unit that detects a terrestrial communication cell that can be provided on the ground by a terrestrial base station installed on the ground; and
  a terrestrial base station operating state control unit that controls the operating state of the terrestrial base station based on the detection results of the communication device detection unit and the terrestrial communication cell detection unit.

2. The communication control apparatus according to item 1, wherein the communication device detection unit detects a communication device based on random access information transmitted by the communication device to the non-terrestrial base station.

3. The communication control apparatus according to item 1 or 2, wherein
  the terrestrial communication cell detection unit and the terrestrial base station operating state control unit are installed in a ground station that is installed on the ground and can communicate with the non-terrestrial base station, the terrestrial communication cell detection unit acquires information of the terrestrial communication cell from the terrestrial base station through an inter-station interface between the ground station and the terrestrial base station, and the terrestrial base station operating state control unit controls the operating state of the terrestrial base station through the inter-station interface.

4. The communication control apparatus according to any of items 1 to 3, wherein
the communication device detection unit detects the location of a communication device in the non-terrestrial communication cell, and
the terrestrial base station operating state control unit sets the operating state of the terrestrial base station to a communication-enabled state that enables communication with the communication device, when the location of the communication device is within a predetermined distance from the terrestrial communication cell.

5. The communication control apparatus according to any of items 1 to 4, wherein
the communication device detection unit detects the location of a communication device in the non-terrestrial communication cell, and
the terrestrial base station operating state control unit sets the operating state of the terrestrial base station to a communication-disabled state that disables communication with the communication device, when the location of the communication device is outside a predetermined distance from the terrestrial communication cell.

6. The communication control apparatus according to any of items 1 to 5, wherein
the communication device detection unit detects the movement of a communication device in the non-terrestrial communication cell, and
the terrestrial base station operating state control unit sets the operating state of the terrestrial base station to a communication-enabled state that enables communication with the communication device, when the communication device is moving toward the terrestrial communication cell.

7. The communication control apparatus according to any of items 1 to 6, wherein
the communication device detection unit detects the movement of a communication device in the non-terrestrial communication cell, and
the terrestrial base station operating state control unit sets the operating state of the terrestrial base station to a communication-disabled state that disables communication with the communication device, when the communication device is not moving toward the terrestrial communication cell.

8. The communication control apparatus according to any of items 1 to 7, wherein
the communication device detection unit detects the service quality request of a communication device in the non-terrestrial communication cell, and
the terrestrial base station operating state control unit sets the operating state of a terrestrial base station that can provide a terrestrial communication cell to the communication device to a communication-enabled state that enables communication with the communication device, when the non-terrestrial base station cannot meet the service quality request.

9. The communication control apparatus according to any of items 1 to 8, wherein the terrestrial base station operating state control unit sets the operating state of the terrestrial base station to a communication-disabled state, when no communication device is detected in the non-terrestrial communication cell by the communication device detection unit.

10. The communication control apparatus according to any of items 1 to 9, wherein the terrestrial base station operating state control unit sets the operating state of the terrestrial base station to a communication-disabled state, when no communication device is detected by the communication device detection unit in the location registration area to which the non-terrestrial communication cell belongs.

11. The communication control apparatus according to any of items 1 to 10, wherein the terrestrial base station operating state control unit sets the operating state of the terrestrial base station to a communication-disabled state, when no communication device is detected in the non-terrestrial communication cell by the communication device detection unit for a predetermined time period.

12. The communication control apparatus according to any of items 1 to 11, wherein the terrestrial base station operating state control unit is able to set the operating state of a terrestrial base station that can provide a terrestrial communication cell that overlaps with the non-terrestrial communication cell to a communication-disabled state.

13. The communication control apparatus according to any of items 1 to 12, wherein the non-terrestrial base station is a communication satellite flying in outer space.

14. A communication control method comprising:
detecting a communication device in a non-terrestrial communication cell provided on the ground by a flying non-terrestrial base station;
detecting a terrestrial communication cell that can be provided on the ground by a terrestrial base station installed on the ground; and controlling the operating state of the terrestrial base station based on the detection results of the communication device and the terrestrial communication cell.

15. A computer-readable medium storing a communication control program causing a computer to perform:
detecting a communication device in a non-terrestrial communication cell provided on the ground by a flying non-terrestrial base station;
detecting a terrestrial communication cell that can be provided on the ground by a terrestrial base station installed on the ground; and
controlling the operating state of the terrestrial base station based on the detection results of the communication device and the terrestrial communication cell.

The present disclosure relates to control of operating state of terrestrial base station via non-terrestrial base station in communication system.

1 wireless communication system, 2 communication device, 3 communication control apparatus, 11 5G wireless communication system, 12 4G wireless communication system, 13 satellite communication system, 31 communication device detection unit, 32 terrestrial communication cell detection unit, 33 terrestrial base station operating state control unit, 111 5G base station, 112 5G cell, 121 4G base station, 122 4G cell, 131 communication satellite, 132 satellite communication cell, 133 gateway, 311 random access information detection unit, 312 communication device movement detection unit, 313 communication device location detection unit, 314 service quality request detection unit, 331 communication-enabled state switching unit, 332 communication-disabled state switching unit.

What is claimed is:

1. A communication control apparatus comprising:
a communication device detection unit that detects a communication device in a non-terrestrial communication cell provided on the ground by a flying non-terrestrial base station;
a terrestrial communication cell detection unit that detects a terrestrial communication cell that can be provided on the ground by a terrestrial base station installed on the ground; and
a terrestrial base station operating state control unit that controls the operating state of the terrestrial base station based on the detection results of the communication device detection unit and the terrestrial communication cell detection unit.

2. The communication control apparatus according to claim 1, wherein the communication device detection unit detects a communication device based on random access information transmitted by the communication device to the non-terrestrial base station.

3. The communication control apparatus according to claim 1, wherein
the terrestrial communication cell detection unit and the terrestrial base station operating state control unit are installed in a ground station that is installed on the ground and can communicate with the non-terrestrial base station,
the terrestrial communication cell detection unit acquires information of the terrestrial communication cell from the terrestrial base station through an inter-station interface between the ground station and the terrestrial base station, and
the terrestrial base station operating state control unit controls the operating state of the terrestrial base station through the inter-station interface.

4. The communication control apparatus according to claim 1, wherein
the communication device detection unit detects the location of a communication device in the non-terrestrial communication cell, and
the terrestrial base station operating state control unit sets the operating state of the terrestrial base station to a communication-enabled state that enables communication with the communication device, when the location of the communication device is within a predetermined distance from the terrestrial communication cell.

5. The communication control apparatus according to claim 1, wherein
the communication device detection unit detects the location of a communication device in the non-terrestrial communication cell, and
the terrestrial base station operating state control unit sets the operating state of the terrestrial base station to a communication-disabled state that disables communication with the communication device, when the location of the communication device is outside a predetermined distance from the terrestrial communication cell.

6. The communication control apparatus according to claim 1, wherein
the communication device detection unit detects the movement of a communication device in the non-terrestrial communication cell, and
the terrestrial base station operating state control unit sets the operating state of the terrestrial base station to a communication-enabled state that enables communication with the communication device, when the communication device is moving toward the terrestrial communication cell.

7. The communication control apparatus according to claim 1, wherein
the communication device detection unit detects the movement of a communication device in the non-terrestrial communication cell, and
the terrestrial base station operating state control unit sets the operating state of the terrestrial base station to a communication-disabled state that disables communication with the communication device, when the communication device is not moving toward the terrestrial communication cell.

8. The communication control apparatus according to claim 1, wherein
the communication device detection unit detects the service quality request of a communication device in the non-terrestrial communication cell, and
the terrestrial base station operating state control unit sets the operating state of a terrestrial base station that can provide a terrestrial communication cell to the communication device to a communication-enabled state that enables communication with the communication device, when the non-terrestrial base station cannot meet the service quality request.

9. The communication control apparatus according to claim 1, wherein the terrestrial base station operating state control unit sets the operating state of the terrestrial base station to a communication-disabled state, when no communication device is detected in the non-terrestrial communication cell by the communication device detection unit.

10. The communication control apparatus according to claim 1, wherein the terrestrial base station operating state control unit sets the operating state of the terrestrial base station to a communication-disabled state, when no communication device is detected by the communication device detection unit in the location registration area to which the non-terrestrial communication cell belongs.

11. The communication control apparatus according to claim 1, wherein the terrestrial base station operating state control unit sets the operating state of the terrestrial base station to a communication-disabled state, when no communication device is detected in the non-terrestrial communication cell by the communication device detection unit for a predetermined time period.

12. The communication control apparatus according to claim 1, wherein the terrestrial base station operating state control unit is able to set the operating state of a terrestrial base station that can provide a terrestrial communication cell that overlaps with the non-terrestrial communication cell to a communication-disabled state.

13. The communication control apparatus according to claim 1, wherein the non-terrestrial base station is a communication satellite flying in outer space.

14. A communication control method comprising:
detecting a communication device in a non-terrestrial communication cell provided on the ground by a flying non-terrestrial base station;
detecting a terrestrial communication cell that can be provided on the ground by a terrestrial base station installed on the ground; and
controlling the operating state of the terrestrial base station based on the detection results of the communication device and the terrestrial communication cell.

15. A non-transitory computer-readable medium storing a communication control program causing a computer to perform: detecting a communication device in a non-terrestrial communication cell provided on the ground by a flying non-terrestrial base station; detecting a terrestrial communication cell that can be provided on the ground by a terrestrial base station installed on the ground; and controlling the operating state of the terrestrial base station based on the detection results of the communication device and the terrestrial communication cell.

\* \* \* \* \*